United States Patent
Bubb et al.

(10) Patent No.: US 10,596,721 B2
(45) Date of Patent: Mar. 24, 2020

(54) APPARATUS AND METHOD OF MANUFACTURING CERAMIC HONEYCOMB BODY

(71) Applicant: CORNING INCORPORATED, Corning, NY (US)

(72) Inventors: Keith Norman Bubb, Beaver Dams, NY (US); Conor James Walsh, Campbell, NY (US)

(73) Assignee: Corning Incorporated, Corning, NY (US)

( * ) Notice: Subject to any disclaimer, the term of this patent is extended or adjusted under 35 U.S.C. 154(b) by 295 days.

(21) Appl. No.: 15/528,670

(22) PCT Filed: Nov. 20, 2015

(86) PCT No.: PCT/US2015/061726
§ 371 (c)(1),
(2) Date: May 22, 2017

(87) PCT Pub. No.: WO2016/085779
PCT Pub. Date: Jun. 2, 2016

(65) Prior Publication Data
US 2019/0099916 A1    Apr. 4, 2019

Related U.S. Application Data

(60) Provisional application No. 62/084,321, filed on Nov. 25, 2014.

(51) Int. Cl.
C04B 37/00    (2006.01)
B29C 48/30    (2019.01)
(Continued)

(52) U.S. Cl.
CPC .............. *B28B 3/269* (2013.01); *B28B 1/002* (2013.01); *B28B 11/16* (2013.01); *B28B 11/168* (2013.01);
(Continued)

(58) Field of Classification Search
CPC ......... B28B 3/269; B28B 1/002; B28B 11/16; B28B 11/168; B28B 19/0038;
(Continued)

(56) References Cited

U.S. PATENT DOCUMENTS 1,598,201 A    8/1926    Koppitz
2,230,309 A    2/1941    Reed
(Continued)

FOREIGN PATENT DOCUMENTS

CN    102225586 A    10/2011
EP    657259 A1    6/1995
(Continued)

OTHER PUBLICATIONS

PCT Search Report and Written Opinion. International Searching Authority. PCT/US15/061726, dated Jul. 13, 2016.
(Continued)

*Primary Examiner* — Alex B Efta (57) ABSTRACT

An apparatus and method of manufacturing a porous ceramic segmented honeycomb body (340,340') comprising axial channels (216) extending from a first end face (220) to a second end face (224). A plurality of porous ceramic honeycomb segments (204) is moved axially past respective apertures (110) of an adhesive applying device (100). Adhesive (118) is applied through openings (126) in the adhesive applying device (100) onto peripheral axial surfaces of each porous ceramic honeycomb segment (204). The plurality of porous ceramic honeycomb segments (204) enters a wide opening (318) of a tapered chamber (314) and exits a narrow
(Continued)

opening (322) of the tapered chamber (314); a tapered wall (326) from the wide opening (318) to the narrow opening (322) presses the plurality of porous ceramic honeycomb segments (204) together forming the porous ceramic segmented honeycomb body (340,340'). The adhesive (118) on the peripheral axial surfaces between respective porous ceramic honeycomb segments (204) is distributed by the pressing.

11 Claims, 9 Drawing Sheets

(51) Int. Cl.
| | |
|---|---|
| B29C 48/00 | (2019.01) |
| B29C 48/11 | (2019.01) |
| B28B 19/00 | (2006.01) |
| B28B 3/26 | (2006.01) |
| B28B 1/00 | (2006.01) |
| B28B 11/16 | (2006.01) |

(52) U.S. Cl.
CPC ...... *B28B 19/0038* (2013.01); *B29C 48/0022* (2019.02); *B29C 48/11* (2019.02); *B29C 48/30* (2019.02); *B29C 48/3001* (2019.02); *C04B 37/003* (2013.01); *C04B 37/005* (2013.01); *C04B 2235/5216* (2013.01); *C04B 2237/04* (2013.01)

(58) Field of Classification Search
CPC . B29C 48/3001; B29C 48/0022; B29C 48/30; B29C 48/11; C04B 37/005; C04B 2235/5216; C04B 37/003; C04B 2237/04
See application file for complete search history.

(56) References Cited

U.S. PATENT DOCUMENTS

| | | | |
|---|---|---|---|
| 2,908,037 | A | 10/1959 | Harkenrider |
| 3,038,202 | A | 6/1962 | Harkenrider |
| 4,550,005 | A | 10/1985 | Kato |
| 4,839,120 | A | 6/1989 | Baba et al. |
| 6,817,858 | B2 | 11/2004 | Howsam |
| 7,056,568 | B2 | 6/2006 | Ichikawa et al. |
| 7,169,341 | B2 | 1/2007 | Bruck et al. |
| 7,413,625 | B2 | 8/2008 | Fujita et al. |
| 7,862,672 | B2 | 1/2011 | Ohno et al. |
| 7,871,688 | B2 | 1/2011 | Ohno et al. |
| 8,585,945 | B2 | 11/2013 | Saito et al. |
| 9,132,578 | B2 * | 9/2015 | Anthony ............... B05C 5/0208 |
| 9,199,188 | B2 | 12/2015 | Kanai et al. |
| 2006/0169384 | A1 | 8/2006 | Fujita et al. |
| 2006/0254713 | A1 | 11/2006 | Fujita et al. |
| 2006/0292331 | A1 | 12/2006 | Ohno et al. |
| 2007/0235128 | A1 | 10/2007 | Fujita et al. |
| 2009/0085241 | A1 | 4/2009 | Koch et al. |
| 2009/0126863 | A1 * | 5/2009 | Bardon ............... B01D 46/0001 156/197 |
| 2009/0220735 | A1 | 9/2009 | Mizuno et al. |
| 2009/0321999 | A1 | 12/2009 | Ogura |
| 2010/0064871 | A1 | 3/2010 | Koch |
| 2011/0262291 | A1 | 10/2011 | Fleger et al. |
| 2011/0262691 | A1 | 10/2011 | Naruse et al. |
| 2012/0160395 | A1 | 6/2012 | Ohno |
| 2012/0237648 | A1 | 9/2012 | Ortiz |
| 2015/0017330 | A1 * | 1/2015 | Takano ................... C04B 41/46 427/290 |
| 2015/0044334 | A1 | 2/2015 | Walther et al. |

FOREIGN PATENT DOCUMENTS

| | | | | |
|---|---|---|---|---|
| EP | | 1479882 A1 * | 11/2004 | ......... B01D 46/2429 |
| JP | | 61168903 A | 7/1986 | |
| JP | | 11000909 A | 1/1999 | |
| JP | | 2002219317 A | 8/2002 | |
| JP | | 2007268529 A | 10/2007 | |
| JP | | 2008119604 | 5/2008 | |
| JP | | 2009114039 A | 5/2009 | |
| JP | | 05180942 B2 | 4/2013 | |
| JP | | 5351449 B2 | 11/2013 | |
| KR | | 841509 B1 | 6/2008 | |
| WO | | 1997045238 A1 | 12/1997 | |
| WO | | 2010130390 A2 | 11/2010 | |

OTHER PUBLICATIONS

English Translation of JP2017527733 Office Action dated Aug. 28, 2018; 7 Pages; Japanese Patent Office.

English Translation of CN201580074368.5 First Office Action dated Jan. 9, 2019, China Patent Office, 10 Pgs.

* cited by examiner

APPARATUS AND METHOD OF MANUFACTURING CERAMIC HONEYCOMB BODY

This application is a national stage application under 35 U.S.C. § 371 of International Application No. PCT/US2015/061726, filed on Nov. 20, 2015, which claims the benefit of and priority to U.S. Provisional Patent Application Ser. No. 62/084,321 filed on Nov. 25, 2014, the contents of these applications are relied upon and incorporated herein by reference in their entireties.

BACKGROUND

Field

Exemplary embodiments of the present disclosure relate to methods of manufacturing ceramic segmented honeycomb bodies, more particularly, to axially bonding honeycomb segments together to produce a ceramic segmented honeycomb body.

Discussion of the Background

After-treatment of exhaust gas from internal combustion engines may use catalysts supported on high-surface area substrates and, in the case of diesel engines and some gasoline direct injection engines, a catalyzed filter for the removal of carbon soot particles. Filters and catalyst supports in these applications may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters, herein referred to generically as honeycomb bodies, may be used in these applications.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a method of manufacturing a ceramic segmented honeycomb body.

Exemplary embodiments of the present disclosure also provide an apparatus to axially bond honeycomb segments to produce a ceramic segmented honeycomb body.

Additional features of the disclosure will be set forth in the description which follows, and in part will be apparent from the description, or may be learned by practice of the disclosure.

An exemplary embodiment discloses a method of manufacturing a segmented ceramic honeycomb body comprising axial channels extending from a first end face to a second end face. The method includes simultaneously bringing together a plurality of ceramic honeycomb segments toward each other while applying adhesive to a portion of at least one of the segments.

An exemplary embodiment also discloses a method of manufacturing a porous ceramic segmented honeycomb body comprising axial channels extending from a first end face to a second end face. The method includes passing at least two porous ceramic honeycomb segments axially past an applicator, applying adhesive to at least one peripheral axial surface of the at least two honeycomb segments, the at least one peripheral axial surface comprising a surface disposed between the at least two honeycomb segments, and pressing the at least two honeycomb segments together. The pressing includes simultaneously pressing a first portion of the at least two honeycomb segments together while applying the adhesive to a second portion of the at least two honeycomb segments.

An exemplary embodiment also discloses a method of manufacturing a porous ceramic segmented honeycomb body comprising axial channels extending from a first end face to a second end face. The method includes moving a first plurality of porous ceramic honeycomb segments axially through respective apertures of an adhesive applying device. The method includes applying adhesive through openings in the adhesive applying device onto at least one peripheral axial surface of the first plurality of porous ceramic honeycomb segments, the at least one peripheral axial surface comprising a surface disposed between two of the first plurality of porous ceramic honeycomb segments. The method includes moving the first plurality of porous ceramic honeycomb segments into a first end opening of a tapered chamber and out of a second end opening of the tapered chamber, the second end having a narrower opening than the first end to press the plurality of porous ceramic honeycomb segments together forming a first porous ceramic segmented honeycomb body. In the method, the adhesive on the at least one peripheral axial surface is distributed by the pressing.

An exemplary embodiment also discloses an apparatus to axially bond honeycomb segments to produce a ceramic segmented honeycomb body comprising axial channels extending from a first end face to a second end face. The apparatus includes an adhesive applying device and a tapered chamber. The adhesive applying device includes an adhesive input configured to supply adhesive to an interior of the adhesive device, a plurality of apertures configured to each accept a honeycomb segment, and openings configured to dispense adhesive from the interior to at least one peripheral axial surface of at least one honeycomb segment in the apertures. The tapered chamber is configured to accept in a first end opening the honeycomb segments comprising adhesive disposed on the at least one peripheral axial surface, and discharge the honeycomb segments from a second end opening having a smaller opening than the first end to press the plurality of porous ceramic honeycomb segments together so that adhesive on the at least one peripheral axial surface is distributed by the pressing to bond the honeycomb segments forming the porous ceramic segmented honeycomb body.

An exemplary embodiment also discloses an apparatus to form a plurality of honeycomb segment bodies comprising axial channels and a peripheral axial surface. The apparatus includes a die having an inlet face comprising peripheral feed holes and central feed holes, and an outlet face comprising interconnected discharge slots forming pins; and a segment-forming mask positioned downstream from the die and adjacent the outlet face. The segment-forming mask comprises open regions configured to pass the honeycomb segment body comprising axial channels and blocking regions forming a cavity at the outlet face configured to separate each honeycomb segment body and form an outer skin on each honeycomb segment body.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

Axially applying adhesive through the adhesive applying device of FIG. 9, a segmented honeycomb body may be produced as shown in FIG. 10 according to exemplary embodiments of the disclosure. A segmented honeycomb body as shown in FIG. 10 may also be produced by contouring and skinning a bonded segmented honeycomb body after axially applying adhesive through the adhesive applying device of FIG. 1A or FIG. 1B, according to other exemplary embodiments of the disclosure.

DETAILED DESCRIPTION

Substrates and filters can have a multicellular structure, such as that of a honeycomb monolith or a honeycomb body formed by multiple honeycomb segments that are secured together such as by using a ceramic cement. As used herein, an integrally formed honeycomb body is referred to as a "honeycomb monolith" such as produced by a single extruded section. On the other hand, a honeycomb body formed by multiple honeycomb segments that are bonded together is referred to as a "segmented honeycomb body". Extrusion and firing of a large frontal area (LFA) honeycomb monolith has complexities that may not be encountered with a LFA segmented honeycomb body composed of the smaller segments that are, for example, produced individually. A large frontal area (LFA) substrate or filter using smaller pieces (segments) glued or cemented together includes post processing of the smaller pieces to create the LFA segmented honeycomb body.

Generally, the LFA honeycomb monolith may be dried, contoured, fired, and skinned to produce the honeycomb body. Generally, honeycomb segments are dried, fired, and bonded together prior to contouring and skinning to produce the LFA porous ceramic segmented honeycomb body. As used herein, prior to contouring and skinning, the segmented honeycomb body is referred to as a "bonded segmented honeycomb body". Honeycomb segments can be bonded together with cold set adhesive or with adhesives that require subsequent heat treatment such as sintering to cure the adhesive. Adhesives can have bonding strength when wet, when dried, when cold set, and when sintered. Further, unfired, referred to herein as "green", honeycomb segments can be bonded together and subsequently fired (e.g., sintered).

Each channel of the honeycomb body, whether monolithic or segmented, can be plugged at an inlet face or an outlet face to produce a filter. When some channels are left unplugged a partial filter can be produced. The honeycomb body, whether monolithic or segmented, can be catalyzed to produce a substrate. Further, filters and partial filters can be catalyzed to provide multi-functionality.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Exemplary embodiments of this disclosure provide an automated process of axially connecting honeycomb segments to produce a segmented honeycomb body.

Figure 1A:
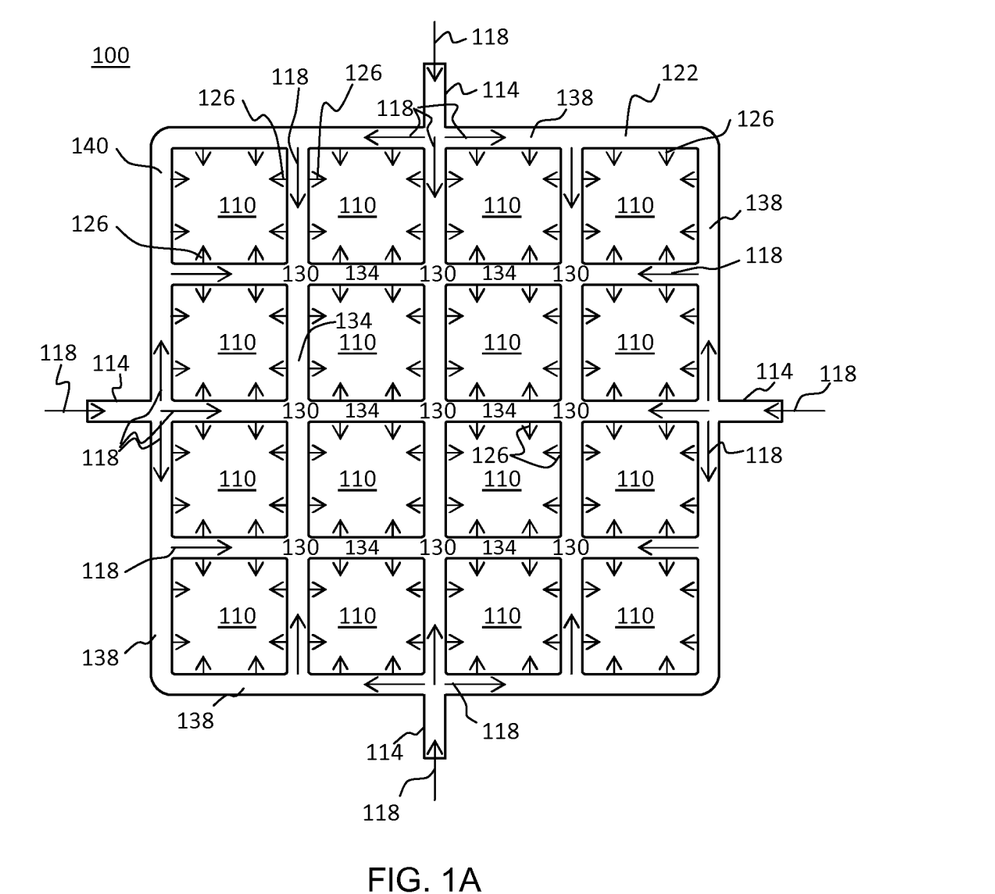
FIGS. 1A and 1B present top view schematic diagrams of adhesive applying devices according to exemplary embodiments of the disclosure.

FIG. 1A presents a top view schematic diagram of an adhesive applying device 100 according to an exemplary embodiment of the disclosure. The adhesive applying device 100 may have a grid pattern as shown in FIG. 1A. The adhesive applying device 100 has device apertures 110 for accepting honeycomb segments in an axial direction perpendicular to the page as described further below. The adhesive applying device 100 has at least one input 114 to accept adhesive 118 into piping 122 and at least one output 126 to dispense adhesive 118 into device apertures 110. As a plurality of honeycomb segments pass through respective device apertures 110, the adhesive 118 dispensed to the device apertures 110 is disposed onto honeycomb segment outer surfaces. The outputs 126 can be at intersections 130 of cross piping 134, along the cross pipes 134 at the device apertures 110. Optionally, adhesive outputs 126 are not located at outer peripheral piping 138. The outputs 126 can be openings such as holes, slots, slits, nozzles, and the like or the outputs 126 can have additional manifolding (not shown) between the piping input 114 and the device apertures 110. The adhesive applying device 100 can have device walls 140 extending above and below piping 122 to guide honeycomb segments through device apertures 110. Adhesive 118 is introduced at input 114 under a pressure to flow the adhesive throughout piping 122. The outputs 126 can be more numerous at device apertures 110 further from input 114 than device apertures 110 closer to input 114 to produce a uniform layer of adhesive 118 on honeycomb segment outer surfaces.

Figure 1B:
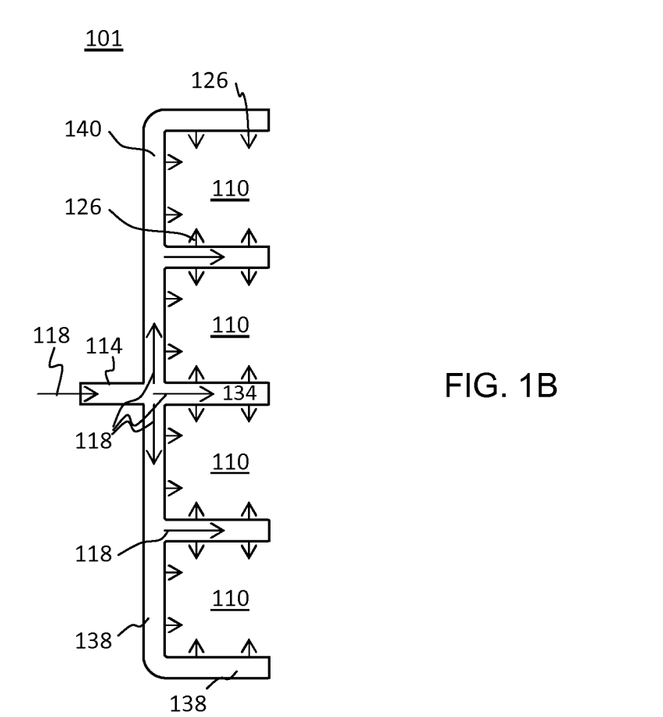

FIG. 1B presents a top view schematic diagram of an adhesive applying device 101 according to an exemplary embodiment of the disclosure. As illustrated in FIG. 1B, device apertures 110 may be open on at least one side. Further, in some exemplary embodiments, device apertures 110 may be in one plane (co-planar) perpendicular to the axial direction and in other exemplary embodiments device apertures 110 may be staggered (non-co-planar).

Figure 2:
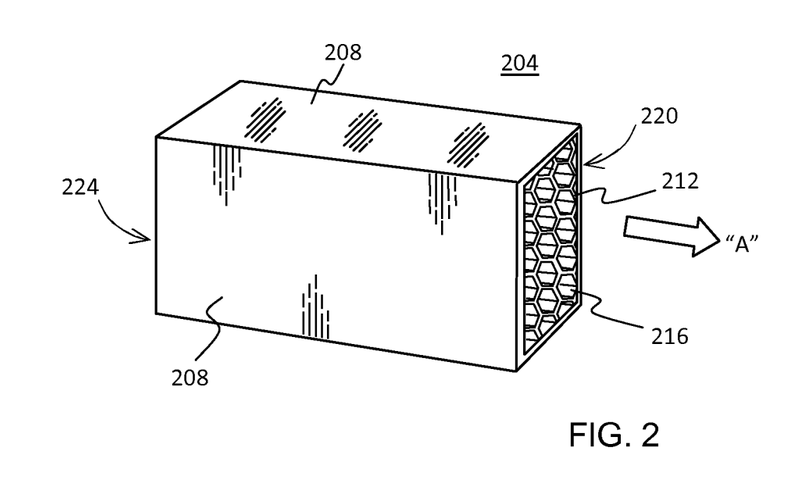
FIG. 2 shows a honeycomb segment including intersecting walls arranged in an axial direction forming channels and a peripheral surface extending from a first end face to a second end face.

FIG. 2 shows a honeycomb segment 204 including a peripheral surface 208 and intersecting walls 212 arranged in an axial direction "A" forming channels 216 extending from a first end face 220 to a second end face 224. The channels 216 can have cross sections of uniform or varying hydraulic diameter of various shapes, such as rectangular (square), hexagonal, other polygonal, circular, elliptical, other curved shapes, and the like, and combinations thereof. The device apertures 110 can be the outer periphery shape of the honeycomb segments 204 taken in cross section to the axial direction "A". FIG. 2 shows rectangular (square) outer periphery shape of honeycomb segment 204 and device aperture 110. However, the honeycomb segment 204 outer periphery can have various cross sectional shapes such as square, rectangular, triangular, circular, elliptical, other polygonal, etc., and combinations thereof, either symmetrical or asymmetrical. For example, the honeycomb segment 204 outer periphery shape cross section can have two orthogonal sides that meet at a common vertex and the other ends of the sides can be joined by a third side that is curved. The aperture opening 110 cross section shape in adhesive applying device 100 can match that of the honeycomb segment 204 outer periphery shape cross section, but in a larger size to provide adhesive 118 to the outer peripheral surface 208.

Figure 3:
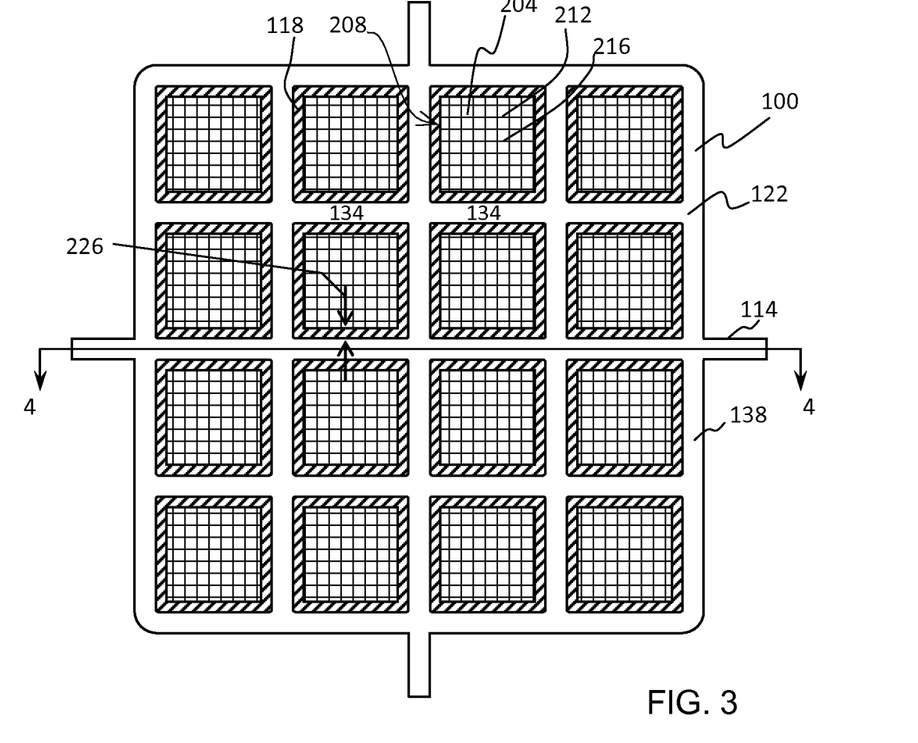
FIG. 3 shows a top view schematic diagram of the adhesive applying device of FIG. 1A having honeycomb segments in device apertures with adhesive uniformly disposed on outer peripheral surfaces according to exemplary embodiments of the disclosure.

FIG. 3 shows a top view schematic diagram of the adhesive applying device 100 of FIG. 1A having honeycomb segments 204 in device apertures 110 with adhesive 118 uniformly disposed on outer surfaces 208 in gap 226. Gap 226 is a space extending from the inner surface of device aperture 110 to outer peripheral surface 208 of honeycomb segment 204. The gap 226 is filled with adhesive 110 by adhesive outputs 126. The gap 226 may be empty of adhesive 118 before adhesive outputs 126. For example, when segments 204 move through adhesive applying device 100 downward, the gap 226 may have no adhesive 118 above adhesive outputs 126, on the other hand, when segments 204 move through adhesive applying device 100 upward, the gap 226 may have no adhesive 118 below adhesive outputs 126. Likewise, when segments 204 move through adhesive applying device 100 horizontally, for example, left to right, the gap 226 may have no adhesive 118 left of adhesive outputs 126.

Figure 4:
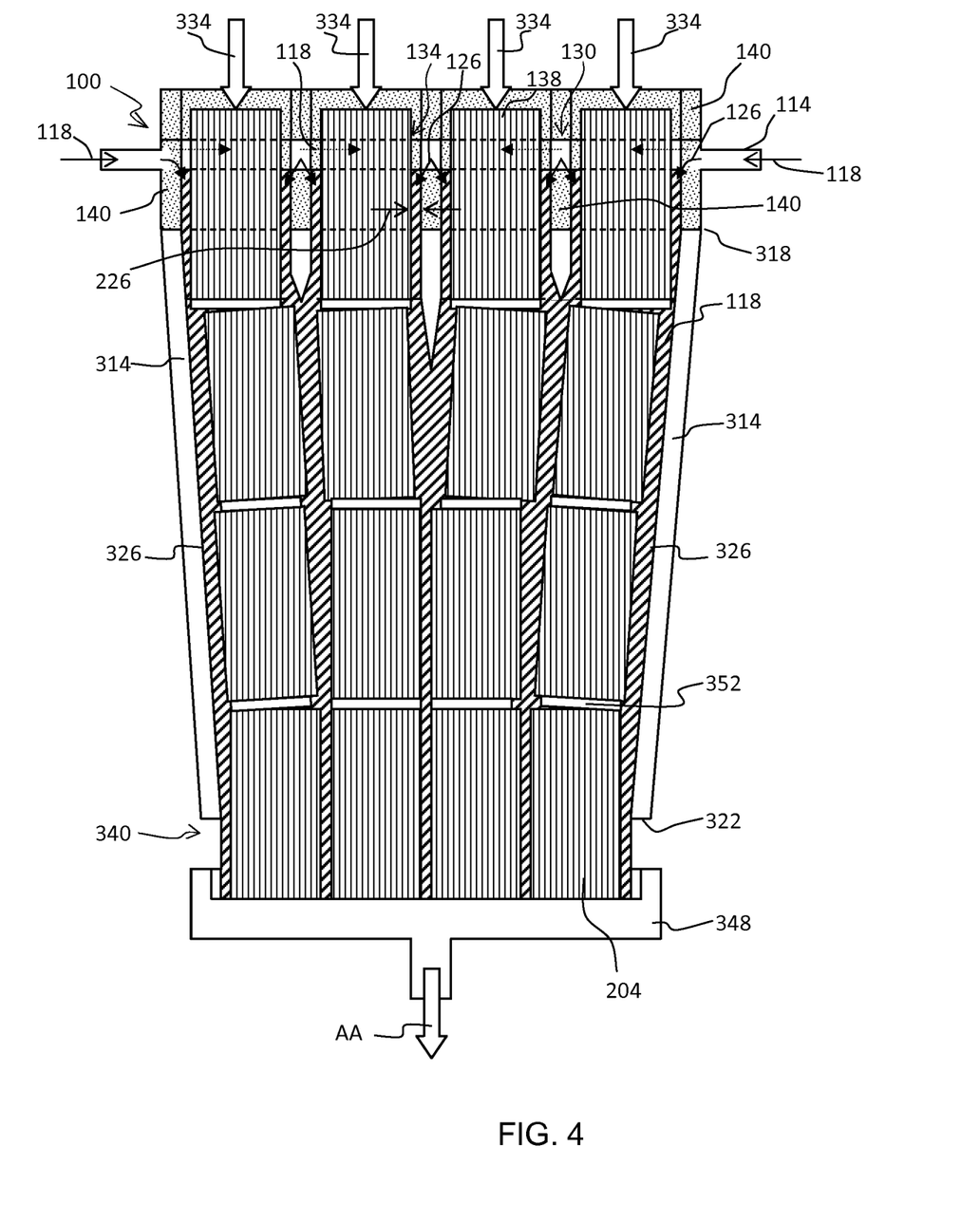
FIG. 4 is a schematic side cross section view of the adhesive applying device of FIG. 3 at line 4-4, illustrating a tapered chamber with honeycomb segments having adhesive uniformly disposed on outer peripheral surfaces pressed and axially bonded into a bonded segmented honeycomb body according to exemplary embodiments of the disclosure.

FIG. 4 is a schematic side cross section view of the adhesive applying device 100 of FIG. 3 at line 4-4, illustrated above a tapered chamber 314 with honeycomb segments 204 having adhesive 118 uniformly disposed on outer peripheral surfaces 208 pressed and axially bonded into a bonded segmented honeycomb body 340 according to exemplary embodiments of the disclosure. The adhesive applying device 100 can be formed integrally with the tapered chamber 314 or the adhesive applying device 100 and the tapered chamber 314 can be separate.

In exemplary embodiments the adhesive applying device 101 of FIG. 1B may be substituted for the adhesive applying device 100 in these embodiments described with reference to FIG. 4.

As mentioned, device walls 140 can guide honeycomb segments 204 into device apertures 110. The device walls 140 may be before and after adhesive outputs 126 so that device walls 140 can guide honeycomb segments 204 having adhesive 118 disposed on peripheral surfaces 208 out of device apertures 110 as well. The illustrated embodiments show the honeycomb segments 204 moving through adhesive applying device 100 from a top to bottom axial direction (down) as indicated by arrow "AA" however this disclosure includes moving honeycomb segments 204 from bottom to top axial direction (up), or even in a horizontal axial direction (side-to-side).

The inner surfaces of device walls 140 or the inner surfaces of device apertures 110 press the adhesive 118 dispensed from outputs 126 into the gap 226 onto the honeycomb segment 204 outer surfaces 208. The inner surfaces of device walls 140 or the inner surfaces of device apertures 110 can press the honeycomb segments 204 together while the adhesive 118 is simultaneously being disposed on outer surfaces 208.

The tapered chamber 314 accepts the honeycomb segments 204 having adhesive 118 disposed on peripheral surfaces 208 from the adhesive applying device 100 at a wide opening 318 of the tapered chamber 314 and discharges the honeycomb segments 204 from a narrow opening 322. Inner wall 326 of tapered chamber 314 presses honeycomb segments 204 having adhesive 118 on outer surfaces 208 together so that a bonded segmented honeycomb body 340 is formed. The inner wall 326 of tapered chamber 314 can press the honeycomb segments 204 together while the adhesive 118 is simultaneously being disposed on outer surfaces 208. A motive force 344 presses honeycomb segments 204 through adhesive applying device 100 in axial direction "AA" and support 348 supports the bonded segmented honeycomb body 340 while moving in direction "AA" in coordination with motive force 344.

As honeycomb segments 204 enter the adhesive applying device 100 at one end by motive force 344, such as a vacuum chuck, bonded segmented honeycomb bodies 340 are discharged from the tapered chamber 314 onto support 348 in a continuous process. Optionally, honeycomb segments 204 enter the adhesive applying device 100 at one end and bonded segmented honeycomb bodies 340 are discharged from the tapered chamber 314 onto support 348 in a non-continuous or indexed process.

While not required in all aspects, masks 352 may be provided to prevent honeycomb segment 204 channels 216 from receiving adhesive 118 or to cushion forces between axially aligned honeycomb segments 204. Masks 352 may be polymer pads, self-adhesive plastic films, and the like.

Inner wall 326 may include rollers to assist axial motion of honeycomb segments 204 having adhesive 118 on outer surfaces 208 while pressing honeycomb segments 204 together to form the bonded segmented honeycomb body 340. While illustrated as having adhesive 118 between outermost honeycomb segments 204 peripheral surfaces 208 and tapered chamber inner walls 326, this disclosure includes exemplary embodiments where no adhesive 118 is between outermost honeycomb segments 204 peripheral surfaces 208 and tapered chamber inner walls 326. Likewise, while both honeycomb segments 204 peripheral surfaces 208 between adjacent honeycomb segments 204 are shown as receiving adhesive 118, this disclosure also covers exemplary embodiments where only one honeycomb segment 204 peripheral surface 208 between adjacent honeycomb segments 204 receives the adhesive 118.

Figure 5:
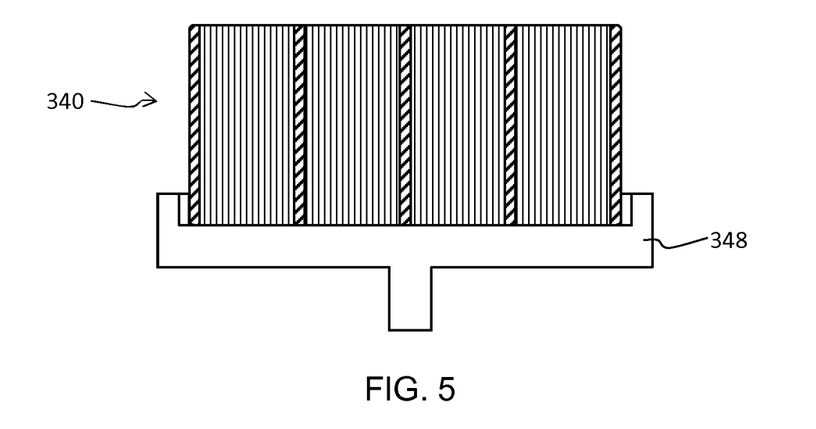
FIG. 5 illustrates a schematic cross section view of a bonded segmented honeycomb body separated from subsequent honeycomb segments in the continuous axial segmentation process according to exemplary embodiments of the disclosure.

As honeycomb segments 204 pressed together with adhesive 118 between outer surfaces 208 exit tapered chamber 314, inner wall 326 at narrow opening 322 can provide the final form of the bonded segmented honeycomb body 340. The bonded segmented honeycomb body 340 can be separated from the next bonded segmented honeycomb body 340 in the axial direction as shown in FIG. 5.

The bonded segmented honeycomb body 340 discharged from the tapered chamber 314 can be subjected to subsequent processing such as drying, firing, contouring, plugging or further joining with other bonded segmented honeycomb bodies 340. That is, each honeycomb segment 204 that enters the adhesive applying device 100 may be a bonded segmented honeycomb body 340 in a larger adhesive applying device 100 to form into a larger bonded segmented honeycomb body 340 as can be understood by the present disclosure without additional repetitive details.

Adhesive 118 can comprise a slurry containing the ceramic having the same composition as the honeycomb segment 204. For example, the slurry can be made of ceramic powder common to the constituents of the honeycomb segment 204 with addition of inorganic fibers such as ceramic fibers, an organic or inorganic binder, and a dispersant such as water. A sol substance such as Si sol can also be included. The adhesive 118 can be cured by sintering or can be a cold set cement. For example, the adhesive can comprise a cement composition of low viscosity that is easy to pump and spread and exhibits properties such as porosity, strength, and coefficient of thermal expansion similar to the properties of honeycomb segments when cured.

Figure 6:
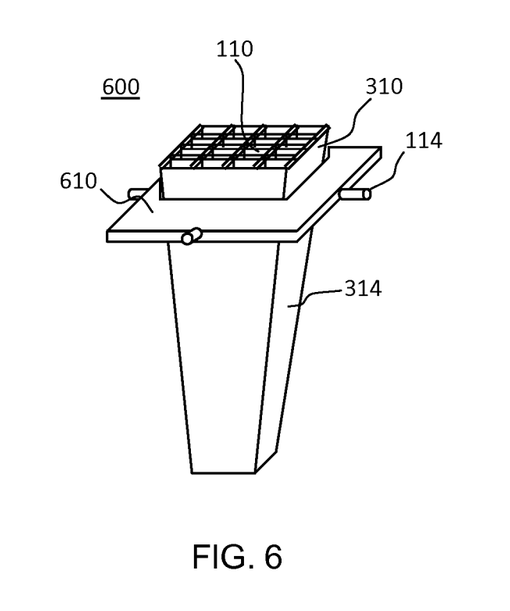
FIG. 6 is a schematic isometric view of an axial adhesive device, adhesive manifold, and tapered chamber of a segmentation adhesive apparatus according to an exemplary embodiment of the disclosure.

FIG. 6 is a schematic isometric view of an axial adhesive device 100, adhesive manifold 610, and tapered chamber 314 of a segmentation adhesive apparatus 600 according to an exemplary embodiment of the disclosure. The segmentation adhesive apparatus 600 in addition to the elements and aspects described above may further include an adhesive delivery manifold 610 to regulate adhesive 118 pressure delivered to the adhesive applying device 100.

Figure 7:
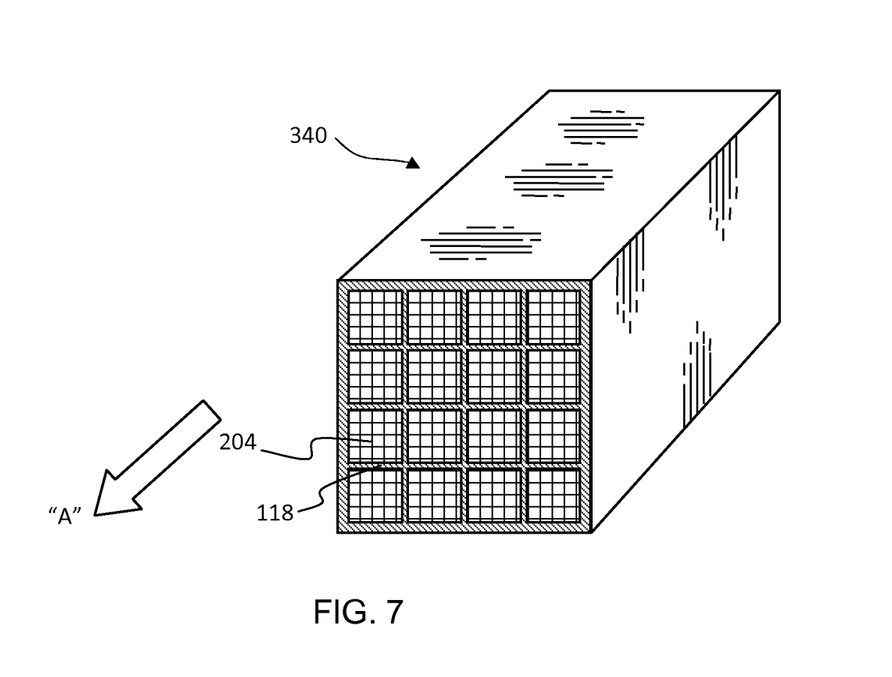
FIG. 7 illustrates a bonded segmented honeycomb body such as shown in FIG. 5 having an adhesive layer on an outer peripheral surface according to exemplary embodiments of the disclosure.
Figure 8:
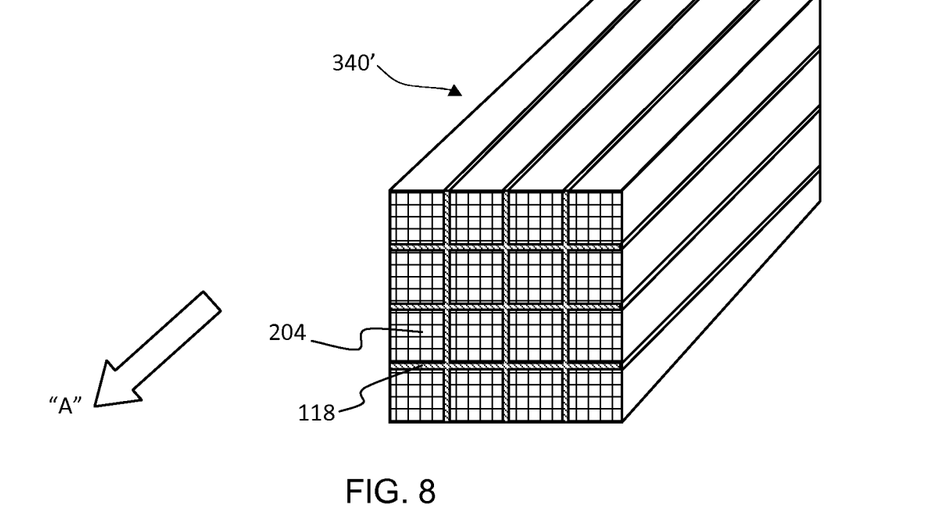
FIG. 8 illustrates a bonded segmented honeycomb body having adhesive layer between adjacent honeycomb segments, but not on an outer peripheral surface according to exemplary embodiments of the disclosure.

FIG. 7 illustrates a bonded segmented honeycomb body 340 such as shown in FIG. 5 having adhesive layer 118 between adjacent honeycomb segments 204 and an adhesive layer 118 on an outer peripheral surface of the outermost honeycomb segments 204 according to exemplary embodiments of the disclosure. FIG. 8 illustrates a bonded segmented honeycomb body 340' having adhesive layer 118 between adjacent honeycomb segments 204, but not on an outer peripheral surface of the outermost honeycomb segments 204 according to exemplary embodiments of the disclosure.

Figure 9:
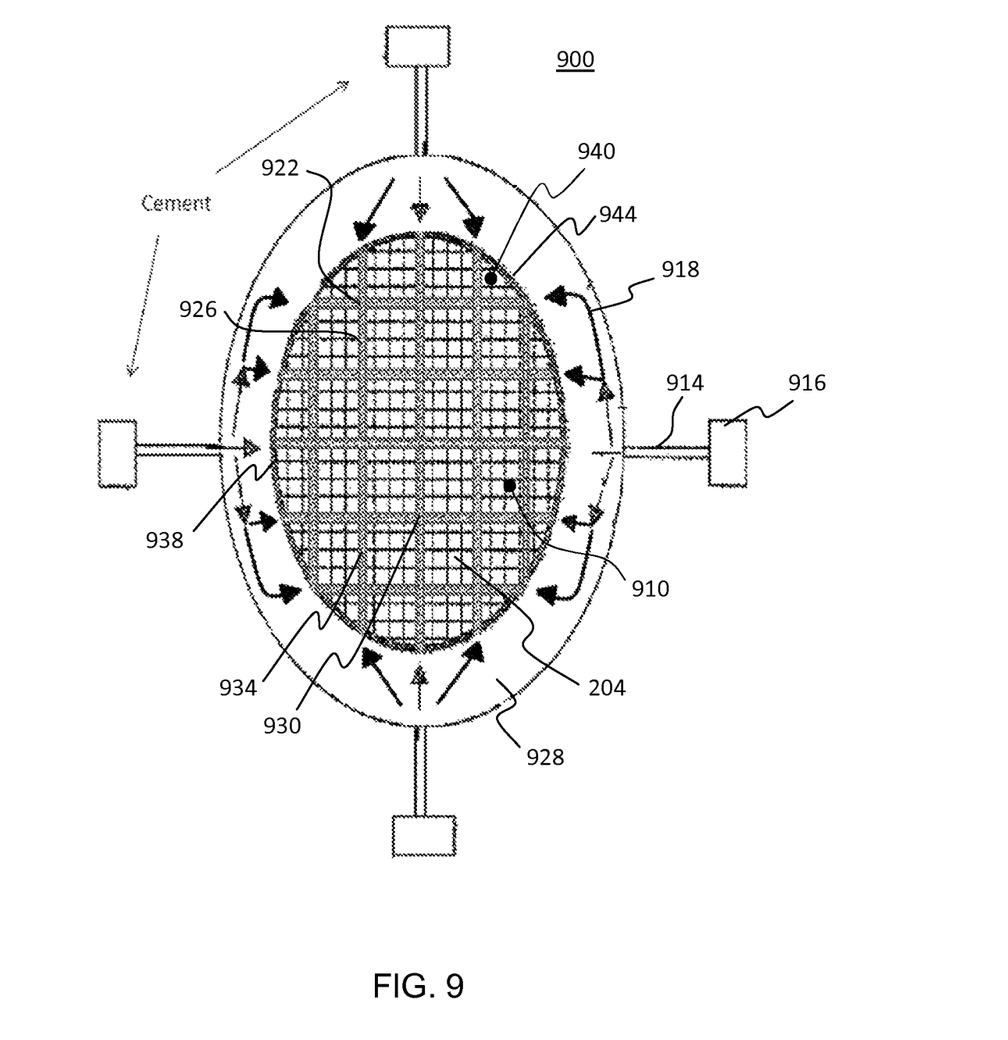
FIG. 9 presents a top view schematic diagram of an adhesive applying device having honeycomb segments in device apertures with adhesive uniformly disposed on outer peripheral surfaces according to another exemplary embodiment of the disclosure where outer peripheral honeycomb segments may be contoured or extruded to have a curved outer wall and a tapered chamber may have a shape of a final bonded segmented honeycomb body.

FIG. 9 presents a top view schematic diagram of an adhesive applying device having honeycomb segments in device apertures with adhesive uniformly disposed on outer peripheral surfaces according to another exemplary embodiment of the disclosure where outer peripheral honeycomb segments may be contoured or extruded to have a curved outer wall and a tapered chamber may have a shape of a final bonded segmented honeycomb body. The adhesive applying device 900 has device apertures 910 for accepting honeycomb segments 204 in an axial direction perpendicular to the page. The adhesive applying device 900 has at least one input 914 to accept adhesive 918 from an adhesive supply 916 into piping 922 and at least one output 926 to dispense adhesive 918 into device apertures 910. A manifold 928 may accept adhesive from the at least one input 914 and dispense adhesive 918 to the piping 922 to regulate adhesive 918 pressure delivered to the adhesive applying device 900. As a plurality of honeycomb segments 204 pass through respective device apertures 910, the adhesive 918 dispensed to the device apertures 910 is disposed onto honeycomb segment outer surfaces 208. The outputs 926 can be at intersections 930 of cross piping 934, along the cross pipes 934 at the device apertures 910. Optionally, adhesive outputs 926 are not located at outer peripheral piping 938. Details of the adhesive applying device 900 are similar to the adhesive applying devices 100 and 101 described above with reference to FIGS. 1A, 1B, 3, 4, and 6. In addition, adhesive applying device 900 illustrated in FIG. 9, has outermost apertures 940 having curved outermost inner walls 944. Device apertures 940 can accept honeycomb segments 204 having the outer periphery shape of the device apertures 940 taken in cross section to the axial direction. For example, the outermost honeycomb segments 204 outer periphery shape cross section is shown in FIG. 9 as having two or three straight sides that meet at right angles where the other side is curved. The aperture opening 940 cross section shape in adhesive applying device 900 can match that of the honeycomb segment 204 outer periphery shape cross section, but in a larger size to provide adhesive 918 to the outer peripheral surfaces 208.

Figure 10:
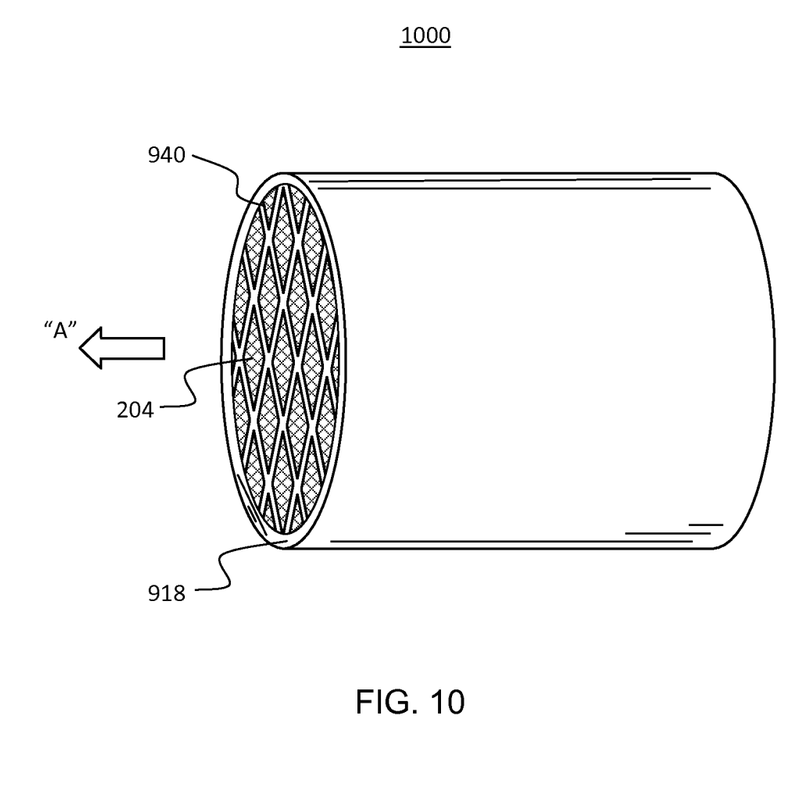

FIG. 10 shows a bonded segmented honeycomb body 1000 discharged from the tapered chamber of an adhesive applying device such as shown in FIG. 9. The bonded segmented honeycomb body 1000 with adhesive layer 918 between adjacent honeycomb segments 204 can be subjected to subsequent processing such as drying, firing, contouring, and plugging. When the bonded segmented honeycomb body 1000 having adhesive layer 918 between adjacent honeycomb segments 204 has the adhesive layer 918 on an outer peripheral surface of the outermost honeycomb segments 204 as shown in FIG. 10, the bonded segmented honeycomb body 1000 may be a segmented honeycomb body 1000. That is, the segmented honeycomb body 1000 may not need further processing operations of contouring and skinning.

Figure 11:
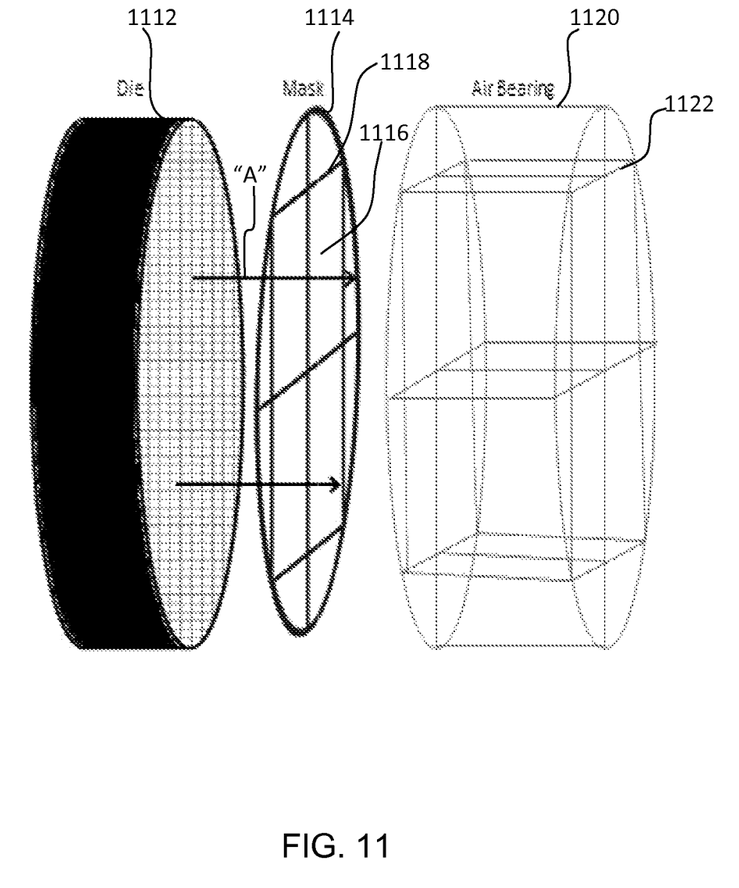
FIG. 11 is a schematic diagram of a die at an extruder front end having a mask disposed after the die to extrude extrudate through the mask to form honeycomb segments according to exemplary embodiments of the disclosure.

FIG. 11 is a schematic diagram of a die 1112 at an extruder front end having a mask 1114 disposed after the die 1112 to extrude extrudate through the mask 1114 to form honeycomb segments according to exemplary embodiments of the disclosure. The extrudate can be a plasticized batch extruded through a die in axial direction "A" to form axially extending intersecting walls with channels there between. The channels can have cross sections of uniform or varying hydraulic diameter of various shapes, such as rectangular (square), hexagonal, other polygonal, circular, elliptical, other curved shapes, and the like, and combinations thereof. Extrusion can be by a continuous process such as a screw extruder, a twin-screw extruder, and the like, or by a discontinuous process such as a ram extruder and the like. In an extruder, an extrusion die can be coupled with respect to a discharge port of an extruder barrel, such as at an end of the barrel. The extrusion die can be preceded by other structure, such as a generally open cavity, screen/homogenizer, or the like to facilitate the formation of a steady plug-type flow front before the batch reaches the extrusion die.

The extrudate generally has a co-extruded, integrally formed, outer peripheral surface (skin) that extends in the axial direction. The extrudate outer periphery can have various cross sectional shapes such as circular, elliptical, polygonal, etc., and combinations thereof, either symmetrical or asymmetrical. The plasticized batch can comprise inorganic powders, inorganic binders, organic binders, pore formers, solvents, non-solvents and the like. Components of the batch contain ceramics and or ceramic precursors to form porous ceramic honeycombs of silicon carbide, cordierite, aluminum titanate, and the like upon sintering. After the plasticized batch is extruded through the die to form the extrudate, it can be cut, dried, and fired to form a porous ceramic honeycomb body or porous ceramic honeycomb body segment.

In FIG. 11 mask 1114 has openings 1116 to pass extrudate to form honeycomb segments 204 and blocking walls 1118 to separate honeycomb segments 204. The blocking walls 1118 also serve to form extrudate into peripheral surfaces 208 of honeycomb segments 204. Air bearing 1120 can be disposed after mask 1114 to support and transport the separate honeycomb segment extrudates. For example, air bearing 1120 can have a support 1122 corresponding to each opening 1116 of mask 1114. Support trays (not shown) may be further disposed on support 1122 to support and transport the separate honeycomb segment extrudates to a cutter and drier. Extrudate formed by die 1112 having mask 1114 may be dried and fired to form porous ceramic honeycomb segments 204. These porous ceramic honeycomb segments 204 may be axially bonded in adhesive applying device 910 of FIG. 9 to form the segmented honeycomb body 1000 of FIG. 10.

According to exemplary embodiments of the disclosure segmented substrates and filters can be made quickly, automatically, consistently, and continuously. The axial segmenting process can be coupled with axial skinning to further streamline the segmented honeycomb body production process reducing manufacturing costs and improving production efficiencies. Thin, uniform segment bonds can increase performance efficiencies of segmented honeycomb bodies, such as lower pressure drop and greater filtration efficiency from larger open frontal areas.

Further advantages of the exemplary embodiments include fast prototyping due to ease of production of small parts and cheap manufacture of extrusion dies with the ability to produce prototypes on development equipment. Also, simplified manufacturing process can be realized due to the ability to standardize dies and hardware because additional segments can be added to change a honeycomb body size or shape. Further, advantages of the exemplary embodiments provide reduced need for advanced extrusion and firing equipment to manufacture large parts. Also, increased capability to produce products of various geometry such as wall thickness, porosity, cells per square inch, diameter, and length, because of simplified process can be realized according to the disclosure. Practice of the exemplary embodiments achieves a wide range of honeycomb body attributes with varying characteristics of the different segments in a segmented honeycomb body. Also, advantages of the exemplary embodiments expands plugging process options because each segment can be plugged prior to axially bonding into a bonded segmented honeycomb body.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A method of manufacturing a porous ceramic segmented honeycomb body comprising axial channels extending from a first end face to a second end face, the method comprising:
   moving at least two porous ceramic honeycomb segments axially past an applicator;
   applying adhesive from the applicator to at least one peripheral axial surface of the at least two honeycomb segments as the at least two porous ceramic honeycomb segments are moved axial past the applicator, the at least one peripheral axial surface comprising a surface disposed between the at least two honeycomb segments; and
   moving the at least two honeycomb segments axially through a tapered chamber from a first end to a second end narrower than the first end to simultaneously press a first portion of the at least two honeycomb segments together as the at least two honeycomb segments are moved axially toward the second end of the tapered chamber while applying the adhesive to a second portion of the at least two honeycomb segments, the second portion being axially spaced from the first portion.

2. A method of manufacturing a porous ceramic segmented honeycomb body comprising axial channels extending from a first end face to a second end face, the method comprising:
   moving a first plurality of porous ceramic honeycomb segments axially through respective apertures of an adhesive applying device;
   applying adhesive through openings in the adhesive applying device apertures onto at least one peripheral axial surface of the first plurality of porous ceramic honeycomb segments, the at least one peripheral axial surface comprising a surface disposed between two of the first plurality of porous ceramic honeycomb segments;
   moving the first plurality of porous ceramic honeycomb segments into a first end opening of a tapered chamber and out of a second end opening of the tapered chamber, the second end having a narrower opening than the first end to press the plurality of porous ceramic honeycomb segments together forming a first porous ceramic segmented honeycomb body,
   wherein the adhesive on the at least one peripheral axial surface is distributed by the pressing.

3. The method of claim 2, further comprising introducing a second plurality of porous ceramic honeycomb segments axially to respective apertures of the adhesive applying device, and forming a second porous ceramic segmented honeycomb body axially to the first porous ceramic segmented honeycomb body out of the second end opening of the tapered chamber.

4. The method claim 2, wherein the applying comprises applying adhesive onto peripheral axial surfaces of each porous ceramic honeycomb segment that faces an adjacent peripheral axial surface of an adjacent porous ceramic honeycomb segment.

5. The method of claim 2, wherein the applying comprises applying adhesive onto one peripheral axial surface of two adjacent facing peripheral axial surfaces of two adjacent porous ceramic honeycomb segments.

6. The method of claim 2, wherein the tapered chamber comprises an inner wall surface extending from the first end opening and tapering to the second end opening, the inner wall surface pressing honeycomb segments together by the moving the first plurality of porous ceramic honeycomb segments to the second end opening.

7. The method of claim 2, wherein outermost honeycomb segments of the first plurality of porous ceramic honeycomb segments comprise curved outermost peripheral axial surfaces.

8. The method of claim 2, wherein each porous ceramic honeycomb segment of the first plurality comprises a porous ceramic segmented honeycomb body.

9. The method of claim 2, wherein the first plurality comprises sixteen porous ceramic honeycomb segments in a four-by-four array and the respective apertures of the adhesive applying device comprise a four-by-four array.

10. The method of claim 2, wherein the applying adhesive, comprises dispensing adhesive into a gap between an inner wall of the respective aperture and the peripheral axial surface of each porous ceramic honeycomb segment.

11. The method of claim 2, further comprising pressing the adhesive to the peripheral axial surfaces of each porous ceramic honeycomb segment with the inner wall of the respective aperture.

* * * * *

UNITED STATES PATENT AND TRADEMARK OFFICE
CERTIFICATE OF CORRECTION

PATENT NO. : 10,596,721 B2
APPLICATION NO. : 15/528670
DATED : March 24, 2020
INVENTOR(S) : Keith Norman Bubb et al.

It is certified that error appears in the above-identified patent and that said Letters Patent is hereby corrected as shown below:

On the Title Page

In Column 2, item (57), Abstract, Line 2, delete "(340,340')" and insert -- (340, 340') --, therefor.

On page 2, in Column 1, item (57), Abstract, Line 5, delete "(340,340')" and insert -- (340, 340') --, therefor.

In the Claims

In Column 10, Line 61, Claim 4, delete "method" and insert -- method of --, therefor.

Signed and Sealed this
Twenty-ninth Day of August, 2023

Katherine Kelly Vidal
Director of the United States Patent and Trademark Office